Sept. 7, 1937.  T. LARRICK  2,092,552
JOINT CLIP
Filed May 10, 1937
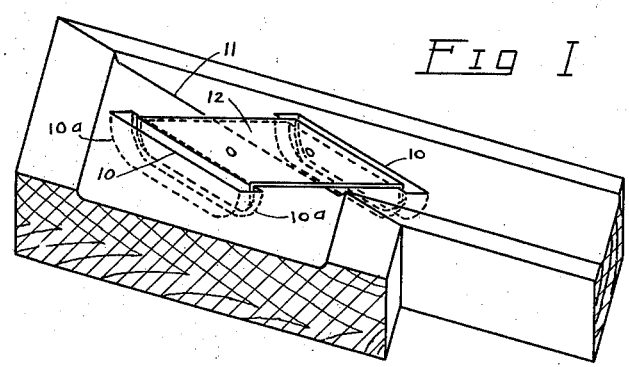
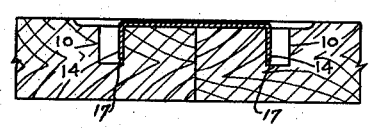
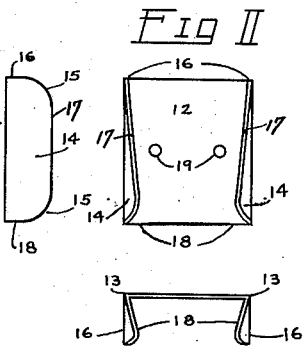
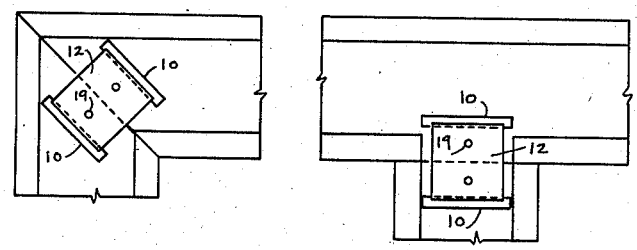
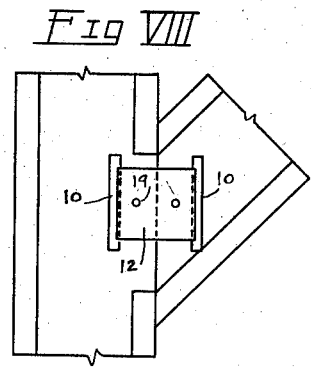
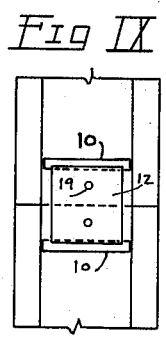
INVENTOR
THOMAS LARRICK
BY
*L. Donald Meyers*
ATTORNEY Patented Sept. 7, 1937

2,092,552

UNITED STATES PATENT OFFICE 2,092,552

JOINT CLIP

Thomas Larrick, Lawrence, Kans., assignor of one-half to Earl J. Wolpert, Lawrence, Kans.

Application May 10, 1937, Serial No. 141,837

5 Claims. (Cl. 20—92)

This invention relates to new and useful improvements in joint clips.

The primary object of the invention is to provide a clip which is designed for maintaining tight and secure joints formed between two members assembled in any desired relationship and with the members constructed of any desired material, such as wood, metal, compositions, or any combination of the same.

A further object of the invention is to provide a joint clip which is extremely inexpensive to manufacture and very easy to install.

Other objects and advantages of the invention will be apparent during the course of the following description.

In the accompanying drawing forming a part of this specification and in which like numerals are employed to designate like parts throughout the same, Fig. 1 is a perspective view of a miter joint which is maintained tight and secure by the form of clip embodying this invention;

Fig. 2 is a bottom plan view of the clip shown assembled in Fig. 1;

Fig. 3 is an end elevational view of the clip;

Fig. 4 is a side elevational view of the clip;

Fig. 5 is a sectional view showing the clip assembled in a miter joint and viewed in end elevation;

Fig. 6 discloses the clip embodying this invention in plan for connecting the two members of a miter joint;

Fig. 7 discloses in plan the clip when employed for maintaining tight and secure a side joint;

Fig. 8 discloses in plan the clip when employed for maintaining tight and secure a mitered side joint; and Fig. 9 is a plan view of the clip employed for maintaining an end joint.

In the drawing, wherein for the purpose of illustration is shown the preferred embodiment of this invention, and referring particularly to Figs. 1 to 4 inclusive, the reference character 10 designates the grooves formed in the members to be connected with abutting edges. These grooves 10 are arranged in parallelism and are provided with rounded ends 10a. The arranging of the grooves 10 in parallelism with each other also places them in parallelism with the faces or ends 11 of the members to be joined. The grooves, therefore, may be formed simultaneously while the members are in abutting relation by means of rotary cutting elements mounted on a common power shaft. It also is possible to cut the grooves separately by employing a gauge which will engage the end surface of the member in which the groove is to be formed. The ability to form both grooves in the two members simultaneously and by means of rotary cutters mounted on a common drive shaft eliminates all possibility of spacing the grooves at an improper distance.

The form of clip to be used in all types of joints is disclosed in detail in Figs. 2, 3, and 4. The clip preferably is made from spring steel of any desired gauge. It is provided with a back portion 12 which has parallel side edges 13. Joined integrally with these side edges are flanges 14 which are rounded at their corners, as designated by the reference character 15. Figs. 2 and 3 clearly illustrate that these flanges 14 are arranged at one end of the back 12 in true parallelism with each other. These parallel edges are designated by the character 16 in Figs. 2 and 3. Starting with the parallel edges 16, the flanges are bent inwardly toward each other with the result that the longitudinally extending bottom edges 17, see Fig. 2, and the end edges 18, see Fig. 3, converge toward the free corners of the flanges at the end of the body 12 opposite to the end having the parallel flange edges 16. This converging of the edges 17 and 18, of course, is accompanied by or results in converging of the body portions of the two flanges, as illustrated in Figs. 2 and 3.

Figs. 1, 2, and 6 to 9 inclusive disclose the back 12 of the clip as having formed therein spaced openings 19. These openings may be engaged by a suitable tool for effecting removal of the clip when it is positioned within the grooves 10 of a joint.

In employing the clip to maintain tight and secure two members of a joint, the clip is started into the grooves by inserting the end edges 16 of the flanges 14 into the ends of the pair of grooves. As the clip is forced or driven into the grooves, the converging walls of the flanges are spread apart. As the clip is made of spring steel, these sprung or spread-apart flange portions will maintain the joint surfaces of the members in tight abutting relation.

Fig. 5 discloses the back 12 of the clip as being countersunk to arrange the same flush with the surfaces of the members forming the joint. This countersinking of the back may be provided or omitted as desired.

The remaining Figs. 6 to 9 inclusive disclose the clip of Figs. 2 to 4 inclusive as functioning to maintain tight and secure several of the well-known forms of joints. These figures merely illustrate the adaptability of the clip to any form of joint.

Although I do not desire to limit myself to any particular measurements, I have determined that very satisfactory results are provided when the flanges at one end of the clip converge sufficiently to position the bent-in corners one-quarter of an inch closer together than the corners at the opposite end of the clip. Should it be necessary to trim the surfaces of the two members after the grooves 10 have been formed therein, the flanges 14 may be forced together to a greater extent, as by means of a vice, or the like, to take care of this trimming. The rounded corners 15 cooperate with the rounded ends 10a of the grooves to permit the clip to be readily inserted and withdrawn relative to the grooves.

It is to be understood that the form of this invention herein shown and described is to be taken as a preferred example of the same, and that various changes in the shape, size, and arrangement of parts may be resorted to without departing from the spirit of the invention or the scope of the subjoined claims.

Having thus described the invention, I claim:

1. In a clip for joints, the combination which comprises abutting members each having a groove cut into its face adjacent the meeting edges of the members, said grooves being arranged in parallelism, a resilient metallic clip adapted to span said edges, said clip having a back portion formed with parallel side edges provided with flanges, the flanges at one end of the clip being spaced a distance equal to and portions of the flanges at the remaining end of the clip being spaced a distance substantially less than the spacing of said grooves, whereby forcing of the flanges into said grooves will exert a constant pressure on the abutting edges of said members.

2. A clip of the type described comprising a resilient body having a back portion formed with parallel side edges provided with flanges, the edges of said flanges at one end of the clip being parallel, the remaining end edges and the bottom edges of said flanges converging.

3. A clip of the type described comprising a resilient body having a back portion formed with parallel side edges and provided with flanges at said edges, said flanges having rounded corners, the rounded corners of the flanges at one end of the clip being spaced a distance substantially equal to the distance between the parallel edges of said back portion, the rounded corners at the remaining end of the clip being spaced a distance substantially less than the spacing of the first-mentioned corners, the bodies of said flanges converging lengthwise of the clip to accommodate said difference in spacing of the flange corners.

4. In a clip for joints, the combination which comprises abutting members each having a groove formed with rounded ends cut into its face adjacent to and parallel with the meeting edges of the members, said faces of the members between the grooves and the meeting edges having countersinking recesses formed therein, a resilient metal clip adapted to span said edges and be seated in said recesses, said clip having a back portion formed with parallel side edges provided with flanges, said flanges having rounded corners, the rounded corners at one end of the clip being spaced a distance equal to and the rounded corners at the other end of the clip being spaced a distance substantially less than the spacing of said grooves, whereby the forcing of the flanges into said grooves will exert a constant pressure on the abutting edges of said members.

5. A clip of the type described comprising a resilient body having a back portion formed with parallel side edges provided with flanges, the corner portions of the flanges at one end of the clip being spaced a distance substantially equal to the distance between the parallel edges of said back, and the corner portions at the remaining end of the clip being spaced a distance substantially less than the spacing of the first-mentioned corners.

THOMAS LARRICK.